US012575550B2

(12) United States Patent
Zhang

(10) Patent No.: US 12,575,550 B2
(45) Date of Patent: Mar. 17, 2026

(54) COMPACT FISHING APPARATUS

(71) Applicant: Wei Zhang, Delta (CA)

(72) Inventor: Wei Zhang, Delta (CA)

( * ) Notice: Subject to any disclaimer, the term of this patent is extended or adjusted under 35 U.S.C. 154(b) by 549 days.

(21) Appl. No.: 17/811,590

(22) Filed: Jul. 11, 2022

(65) Prior Publication Data

US 2022/0338457 A1 Oct. 27, 2022

Related U.S. Application Data

(63) Continuation-in-part of application No. 17/067,711, filed on Oct. 11, 2020, now abandoned.

(60) Provisional application No. 63/220,408, filed on Jul. 9, 2021.

(51) Int. Cl.
| | |
|---|---|
| *A01K 97/06* | (2006.01) |
| *A01K 87/02* | (2006.01) |
| *A01K 97/08* | (2006.01) |
| *A45C 3/00* | (2006.01) |
| *A45C 13/02* | (2006.01) |

(52) U.S. Cl.
CPC .............. *A01K 97/06* (2013.01); *A01K 87/02* (2013.01); *A01K 97/08* (2013.01); *A45C 3/00* (2013.01); *A45C 13/02* (2013.01)

(58) Field of Classification Search
CPC ...... A01K 87/02; A01K 87/005; A01K 97/06; A01K 97/08; E04H 15/60; E04H 2015/326; A45B 2009/005; A45C 2013/026
USPC .............. 403/42, 109.1, 291, 292, 300, 345; 135/121, 127, 128, 65, 74; 43/18.1 R, 43/18.1 CT
See application file for complete search history.

(56) References Cited

U.S. PATENT DOCUMENTS

| | | | | | |
|---|---|---|---|---|---|
| 2,097,185 A | * | 10/1937 | Hall | ........................ | A01K 97/08 |
| | | | | | 220/520 |
| 2,705,015 A | * | 3/1955 | Langlais | ................ | F16M 11/38 |
| | | | | | 138/148 |
| RE28,067 E | * | 7/1974 | Hyman | .................... | A45B 7/00 |
| | | | | | 135/74 |
| 4,212,126 A | * | 7/1980 | Barnett | ................ | A01K 87/005 |
| | | | | | 43/24 |
| 4,237,639 A | * | 12/1980 | Uemori | ................ | A01K 87/025 |
| | | | | | 43/18.1 CT |
| 4,752,008 A | * | 6/1988 | Pratt | ........................ | A45C 13/02 |
| | | | | | 190/110 |
| 4,817,802 A | * | 4/1989 | Pratt | ........................ | A45C 13/02 |
| | | | | | 190/110 |
| 4,960,144 A | * | 10/1990 | Wheatley | ................ | E04H 15/58 |
| | | | | | 135/117 |
| 4,984,662 A | * | 1/1991 | Jacober | ................ | A45C 7/0077 |
| | | | | | 190/125 |

(Continued)

*Primary Examiner* — Katelyn T Truong
(74) *Attorney, Agent, or Firm* — Perpetual Motion Patents

(57) ABSTRACT

Methods and apparatus for expanding a rod from a collapsed position to a formed position are disclosed. One such apparatus includes a plurality of segments for forming the body of the collapsible rod including with each segment coupled to each immediately adjacent segment of the plurality of segments. The apparatus may include a coupler for coupling each segment of the plurality of segments to each immediately adjacent segment of the plurality of segments. A lure case and fishing case are provided for convenient use. The case may be used with collapsible fishing rods and provides a protective case for them. The lure case provides means to separate and distinguish lures for different conditions.

14 Claims, 10 Drawing Sheets

(56) References Cited

U.S. PATENT DOCUMENTS

| | | | | |
|---|---|---|---|---|
| 5,090,526 A * | 2/1992 | Jacober | A45C 7/0077 | 383/110 |
| 5,366,076 A * | 11/1994 | Lyles | A01K 97/08 | 206/315.11 |
| 5,775,021 A * | 7/1998 | Weiss | F41A 29/02 | 42/95 |
| 5,975,393 A * | 11/1999 | Bellamy | A01K 97/08 | 383/41 |
| 6,048,425 A * | 4/2000 | Sunaga | A01K 87/005 | 156/190 |
| 6,266,913 B1 * | 7/2001 | Akiba | A01K 87/005 | 43/18.1 R |
| 6,557,572 B2 * | 5/2003 | Lah | E04H 15/48 | 403/368 |
| 8,684,019 B1 * | 4/2014 | Hudek | A45B 9/04 | 135/77 |
| 2002/0117196 A1 * | 8/2002 | Han | E04H 15/60 | 248/161 |
| 2003/0089390 A1 * | 5/2003 | Seo | E04H 15/60 | 135/120.4 |
| 2003/0122390 A1 * | 7/2003 | Slauf | B25G 1/04 | 294/24 |
| 2006/0070647 A1 * | 4/2006 | Chang | E04H 15/60 | 135/120.3 |
| 2009/0020146 A1 * | 1/2009 | Bong | E04H 15/425 | 135/114 |
| 2009/0293339 A1 * | 12/2009 | Bartholomew | A63B 60/42 | 473/316 |
| 2010/0200032 A1 * | 8/2010 | Lee | A45B 9/00 | 135/74 |
| 2013/0312797 A1 * | 11/2013 | Lah | A45B 9/00 | 135/74 |
| 2014/0041702 A1 * | 2/2014 | Yamamoto | A61H 3/06 | 135/65 |
| 2014/0069475 A1 * | 3/2014 | Lenhart | A45B 9/04 | 135/74 |
| 2014/0261593 A1 * | 9/2014 | Howarth | F16B 7/04 | 135/74 |
| 2016/0298328 A1 * | 10/2016 | Williams | A63B 61/003 | |
| 2018/0027788 A1 * | 2/2018 | Abel | A01K 87/02 | |
| 2019/0298017 A1 * | 10/2019 | Potts | A45C 13/02 | |
| 2020/0260705 A1 * | 8/2020 | Chambers | A01K 87/00 | |
| 2020/0359757 A1 * | 11/2020 | Lee | B65D 25/04 | |

* cited by examiner

400

Hold a coupler in a
state of increased
elastic tension

410

Align rod segments into a
rod

420

Hold the segments in a
rod position by
maintaining sufficient
elastic tension

430

Anchor the coupler at
the rod tip with a hook

440

COMPACT FISHING APPARATUS

FIELD OF THE INVENTION

The invention relates generally to fishing, in particular rods, lures and cases.

BACKGROUND OF THE INVENTION

In the sport of fishing, a typical set up includes a box of lures and a fishing rod. The box will often have dozens of lures that the user might need on a given day. These lures are typically organized into compartments that will fit several lures, without any particular consideration for a useful theme. The user may go through each of the lures in a trial and error approach, which tends to lead to an untidy box.

Fishing rods are relatively long and transporting them may be complicated due to space requirements. Expandable rods, such as telescoping poles, allow long rods to be transported in a compact form. Various types of expanding mechanisms have been used. Examples include telescoping rods, folding rods with hinges, rod segments that may be screwed together and rod segments that may be inserted into adjacent segments and locked into place.

The fishing rod itself is a fragile but cumbersome instrument. In particular, the reel can be damaged through dirt ingress or physical crushing. A typical duffle bag does not offer much protection and tackle boxes are not designed to carry an entire rod. Large, hard cases tend to be heavy and less comfortable to carry long distances.

SUMMARY OF THE INVENTION

The inventor has appreciated the need for apparatus for stowing and carrying fishing rods and lures that address some of the above shortcomings.

According to one aspect, there is provided a collapsible rod. The collapsible rod may include a plurality of segments for forming the body of the collapsible rod including a base segment for forming a base portion of the collapsible rod and a tip segment for forming a tip section of the collapsible rod. Each segment of the plurality of segments may be coupled to each immediately adjacent segment of the plurality of segments.

The collapsible rod may also include a coupler for coupling each segment of the plurality of segments to each immediately adjacent segment of the plurality of segments. The coupler may be biased to apply a force to hold the plurality of segments in a formed position and to urge the plurality of segments into a formed position from a collapsed position.

The collapsible rod may also include one or more positioning guides for guiding adjacent segments into the formed position from the collapsed position. Each positioning guide may be coupled to at least one mating end of each pair of mateable mating ends of the plurality of segments.

In the formed position, the plurality of segments may be aligned end-to-end to form a rod and in the collapsed position, the plurality of segments may be folded against each other such that cylindrical walls of each of the plurality of segments are positioned adjacent each other.

Each segment of the plurality of segments may be hollow with at least one of the mating ends being open.

The coupler may include a cord with a first end of the cord coupled to the base segment and a second end coupled to the tip end. The cord may pass through the open mating ends and may be under elastic tension when the collapsible rod is in the formed position and increased elastic tension when the collapsible rod is in the collapsed position.

The coupler may include a plurality of materials with a central portion including a cord comprised of a material with a relatively larger elasticity than a material comprising an end portion of the coupler coupled to the tip end.

In preferred embodiments, the elastic cord guides for each section are glued to male ferrules. This helps to reduce the male part and female part hitting the ferrule areas, and avoid the blank being cracked. This removes sharp edge of the section, which would otherwise damage the cord. This also helps all the sections of the rod to connect together faster after the rod is released to extend to full length automatically The end portion of the coupler may include a double ended hook extending through the tip end. The double ended hook may have a first hooked end for hooking a loop of the cord for holding the cord. The double ended hook may also have a second hooked end with a shank that passes through a distal end of the tip end and a throat for bending around and hooking on an edge of a wall forming the tip end, thereby anchoring the cord in position by pulling against the tip end, with a hooked portion of the second hooked end extending towards the base segment along an external surface of the tip segment.

Each of the one or more positioning guides may include a flared tube end coupled to a first mating end of each pair of mateable mating ends for receiving a second mating end of the respective pair of mateable mating ends.

The positioning guide may include a tapered end coupled to a second mating end of each pair of mateable mating ends for inserting into a first mating end for guiding the second mating end into the first mating end and for establishing a coupling resistant to bending forces.

The tapered end and the flared tube end of each pair of mateable mating ends may be shaped to create a bend in the collapsible rod when the collapsible rod is in a formed position.

The collapsible rod may also include a ringed insert coupled to an interior of an intermediate segment where the intermediate segment may be positioned between the base segment and tip segment in the formed position. The ringed insert may be formed of a low friction material and may have an aperture through the low friction material. The ringed insert may be shaped and positioned to hold the cord away from an interior wall of the intermediate segment.

The collapsible rod may also include a spring coupled to an interior portion of at least one segment of the plurality of segments. The coupler may include at least one cord. The cord may have a first end coupled to an end of the spring and the cord may pass from the interior portion of the at least one segment to an interior of an adjacent segment of the plurality of segments. The cord may also have a second end coupled to a segment of the plurality of segments such that the spring is under spring tension when the collapsing rod is in the collapsed position and biased to pull the collapsed rod from the collapsed position into alignment in the formed position.

The coupler may include a plurality of couplers. Additionally, the collapsible rod may also include a tightener coupled to the base segment and the coupler for adjusting the elastic tension in the coupler.

According to another aspect, there is provided a method for expanding a rod from a collapsed position to a formed position. The method may include holding a coupler in a state of increased elastic tension in the collapsed position of the rod. The coupler may pass axially through segments of the rod and may couple the segments together. The segments of the rod may be folded against each other such that cylindrical walls of each of the segments are positioned adjacent each other, thereby stretching the coupler relative to the length of coupler in the formed position of the rod.

The method may further include aligning the segments of the rod into the formed position of the rod by releasing a force used to hold the rod in the collapsed position, allowing the coupler to move to a state with a lower elastic tension by twisting and pulling adjacent segments into alignment.

The method may also include holding the rod in a formed position by maintaining sufficient elastic tension in the coupler to press mating ends of adjacent segments together, with the coupler stretching from a base segment of the rod to a tip of the rod.

Aligning the segments of the rod into the formed position may also include pulling, by the coupler under elastic tension, a tapered end of a first segment into an adjacent opening of a second segment.

The method may further include anchoring the coupler to the tip with a hook passing through the tip and the hook hooking to an external wall of the tip.

In accordance with another aspect of the invention there is provided a fishing kit comprising a closable case; a plurality of inserts enclosed within the case and removably retained in place by retaining means; and plural fishing lures mounted to each insert. The inserts are visibly distinguished from each other.

In accordance with another aspect of the invention there is provided a fishing case comprising an openable and closable compartment, carrying strap and protective casing fixed inside the compartment, wherein the protective casing comprises rigid sides and is open at a top.

Thus preferred embodiments of the invention enable the cases to make fishing more convenient.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

FIG. 1b is a close up view of a tip of the collapsible rod, according to the embodiment of FIG. 1a;

DETAILED DESCRIPTION OF THE INVENTION

Figure 5:
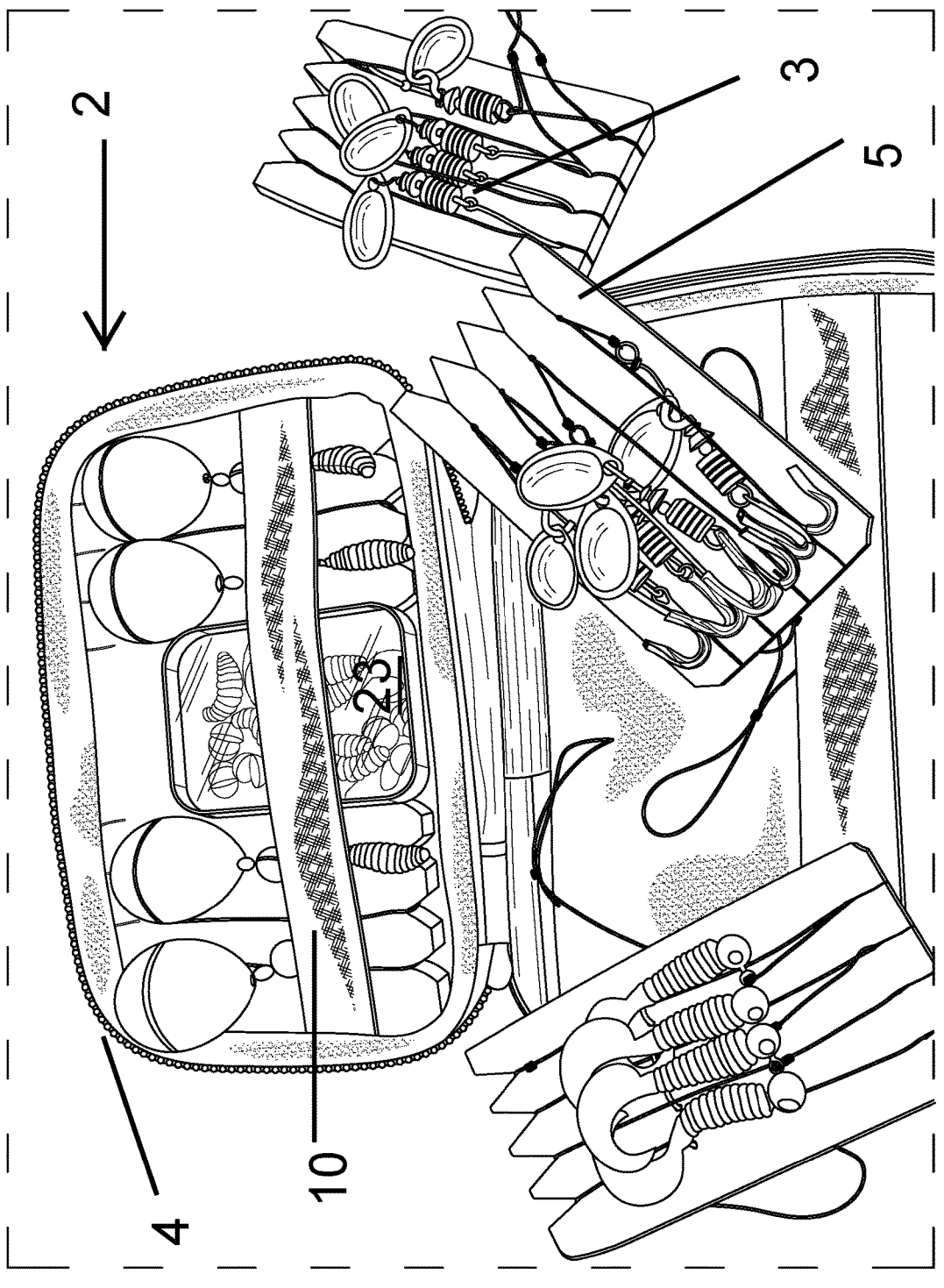
FIG. 5 is a top view of a lure case in an open state.

With reference to the accompanying figures, fishing apparatus are disclosed that provide for compact storage and efficient retrieval of lures and rod. As shown in FIG. 5 there is provided a carrying case, a collapsible fishing rod, and lure case. The lure case and rod are stowable within the carrying case. The instructions provide guidance on which sets of lures to use for given water conditions. A fishing rod is collapsible and may be stored in a novel fishing carrying case.

Collapsible Fishing Rod

Fishing rods, hiking sticks, and other apparatuses that have a rod shape may be cumbersome to transport due to their length. Expandable rods, such as telescoping poles, allow long rods to be transported in a compact form. Various types of expanding mechanisms have been used. Examples include telescoping rods, folding rods with hinges, rod segments that may be screwed together and rod segments that may be inserted into adjacent segments and locked into place.

It may be useful to have the rod segments held in position once the rod is expanded in order to keep the rod rigid and functional. Twist locks, lock nuts, and threaded segments have all been used to fix the segments in position. A disadvantage of these mechanisms and methods is that each segment needs to be separately locked in place, which takes time, particularly when several rod segments are to be joined together.

Additionally, if rod segments are designed to be joined in a particular order, a user may need to keep track of the order the segments are being joined together. Rod segments may be easy to lose as well. In some types of collapsible or expandable rods, a cord or cable passes through the rod segments. This may assist in keeping rod segments ordered and reduce the possibility of losing segments. In some applications, such as fishing rods, some of the rod segments, such as the tip, may have a thin cross-section, making it difficult to have a cord or a cable pass through the tip section.

The present disclosure provides for a collapsible fishing rod in which the rod segments have an elastic cord passing through them from the base section to the tip section. Elastic tension in the cord, as well as shaped ends of adjacent rods shaped to direct a male end of one rod segment to slip into a female end of an adjacent rod segment, may keep the rod segments in position when the rod is in the extended, formed position. Additionally, in the collapsed position, the cord may be further stretched, increasing elastic tension, with the rod segments folded into a bundle and held in place by an external force, such as a holding pouch. Releasing the external force may allow the rod segments to be rotated and pulled into position by the elastic tension, as the cord goes from a position of higher elastic tension to lower elastic tension. The shape of adjacent ends, the male and female ends, may guide the segments into position without the user needing to manually position the rod segments. The present disclosure may also include a hooked piece inserted into the tip end with the hooked piece being hooked at both ends. One end may hook to the elastic cord and the other hooked end may hook through the tip and around the tip end to anchor the hook, and thereby the cord, to the tip end.

Using rod segments coupled through a tensioned cord and an anchoring hook in the tip end may provide a number of advantages over the existing art. For example, using a tensioned cord allows for the rod to remain rigid and to maintain its shape without the use of locking mechanisms or threaded sections. Additionally, with the shaped ends for guiding the rod segments into position as they are pulled together by the tensioned cord, the user does not need to spend time assembling the rod. They user may simply release the holding device, freeing the rod segments to be pulled into position by the tensioned cord.

The use of a double ended hook in the tip section may also provide advantages over the existing art. Having the hooked end pass through the end of the tip end and hook around the external wall of the tip end may provide a strong anchor for the cord in a confined piece. Anchoring the cord to the inside of the very narrow tip end may require a thinner cord and small anchor points, thereby sacrificing the strength of the rod. Additionally, the use of the double ended hook may also allow simpler repairs in case of a failure of the tip end anchor through replacement of the double ended hook instead of replacement of the entire tip end.

Figure 1A:
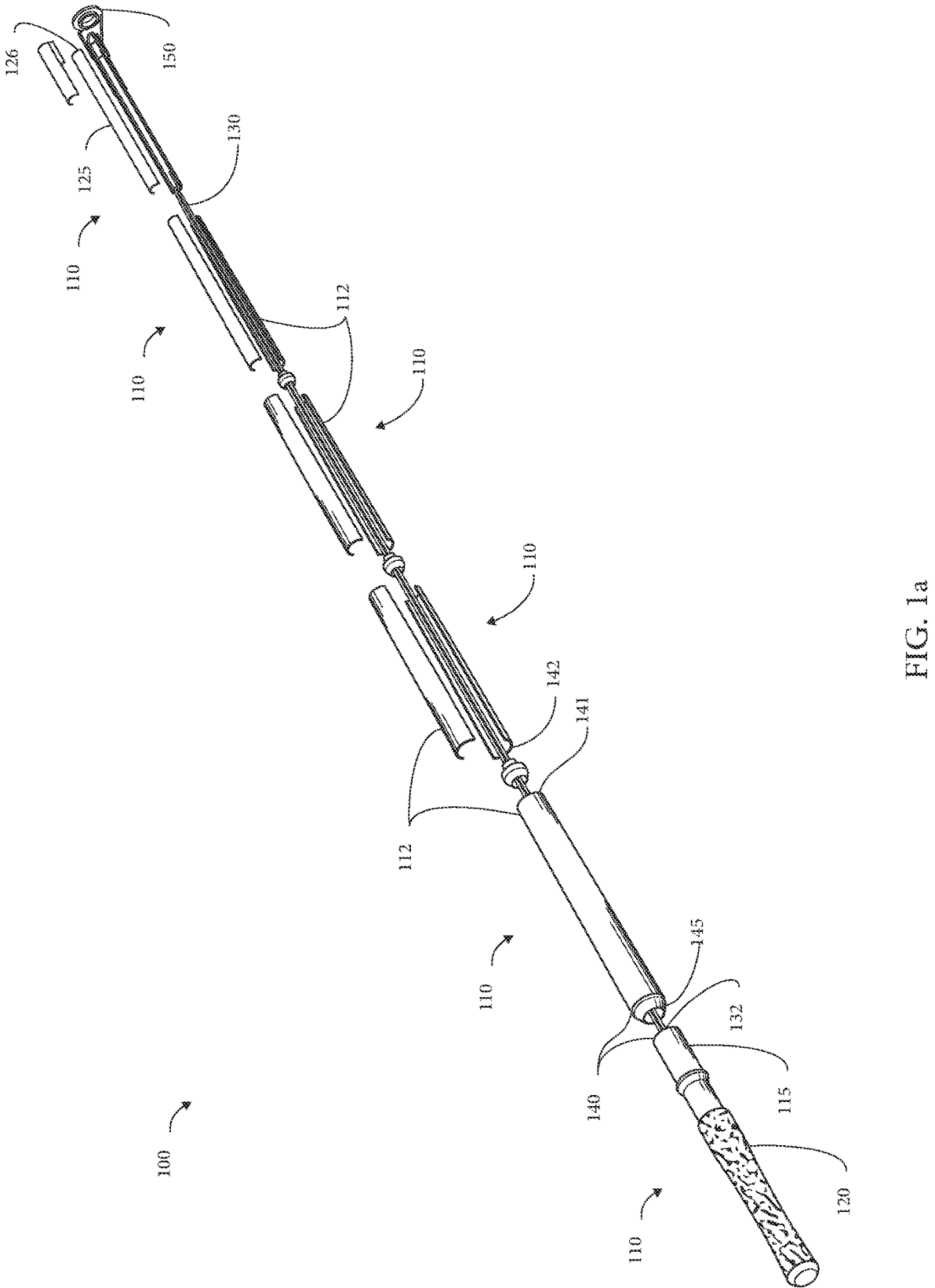
FIG. 1a is an exploded view of a collapsible rod, according to one embodiment.

Referring to FIG. 1a, an embodiment of a collapsible rod is provided at 100. The collapsible rod 100 may include a plurality of segments 110 for forming a body of the collapsible rod 100. The plurality of segments 110 may include a base segment 115 for forming a base portion of the collapsible rod 100 and a tip segment 125 for forming a tip section of the collapsible rod 100. Each segment of the plurality of segments 110 may be coupled to each immediately adjacent segment of the plurality of segments 110.

Figure 2:
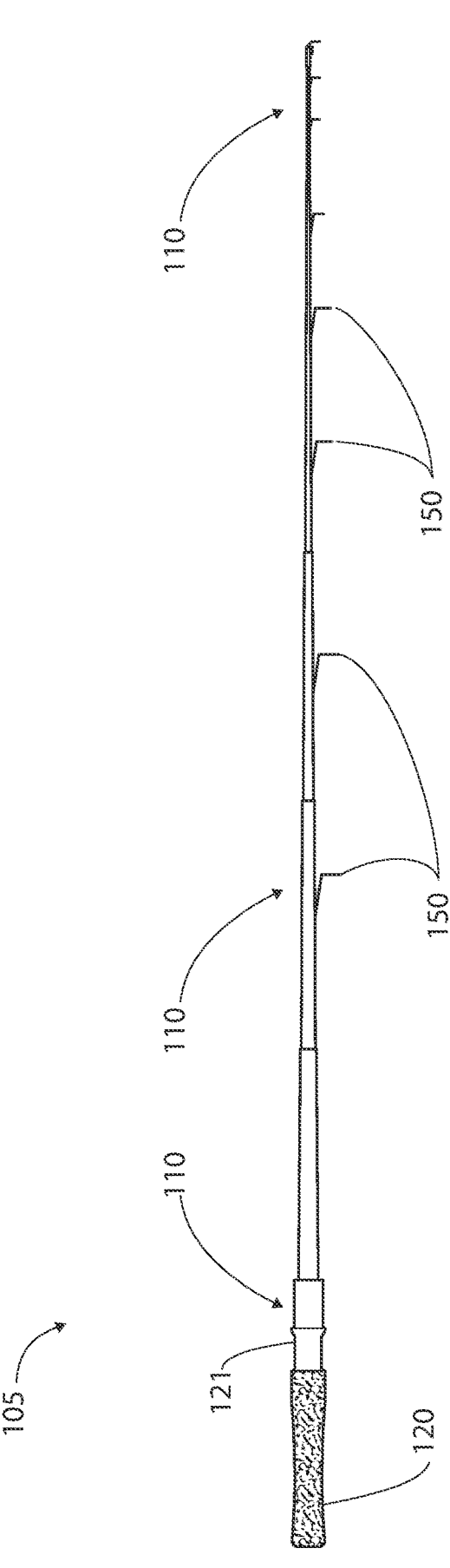
FIG. 2 is a perspective view of a fishing rod in a formed position, according to one embodiment.
Figure 3:
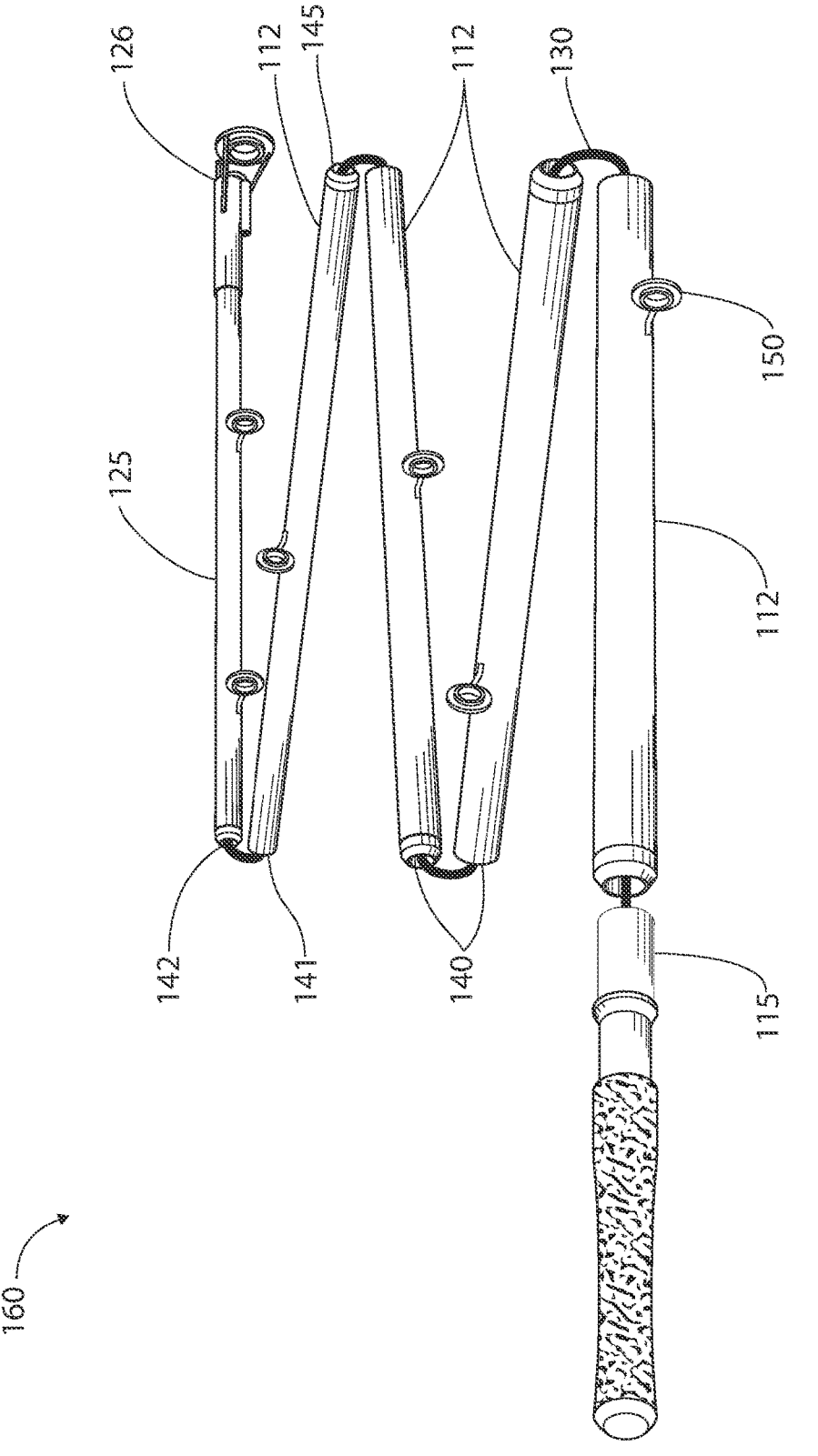
FIG. 3 is a perspective view of a fishing rod in a collapsed position, according to one embodiment.

The collapsible rod 100 may have a formed rod position (seen in FIG. 2 at 105) and a collapsed position (seen in FIG. 3 at 160). In the formed position 105, the plurality of segments 110 may be end-to-end to form a rod. In the collapsed position 160, the plurality of segments 110 may be folded against each other such that cylindrical walls of each of the segments 110 are positioned adjacent each other.

Referring to both FIG. 1a and FIG. 2, in some embodiments, the plurality of segments 110 may be portions of the fishing rod 105. The portions of the fishing rod 105 may include intermediate segments 112, the base segment 115 and the tip segment 125. In some embodiments, the intermediate segments 112 may form a majority of the rod portion of the fishing rod 105. In FIG. 1a, some of the intermediate segments 112 are shown split with a top half and a bottom half. This is for illustrative purposes, although in some embodiments, the intermediate segments 112 may be formed of top of bottom halves joined together.

Any suitable type of intermediate segments 112 may be used, having any suitable dimensions and shape. For example, in some embodiments, the intermediate segments 112 may have a circular cross-section. In certain embodiments, the intermediate segments 112 may be tubular, with both ends being open. For example, the segments 110 of the plurality of segments may be hollow with at least one of the mating ends 141, 142 being open.

Each of the intermediate segments 112 may be tapered, in some embodiments, having a larger cross-section at a base portion and a narrower cross-section at a tip portion. In some embodiments, the cross-section of an intermediate segment 112 may vary by between about 1 mm to 10 mm. In some embodiments, each intermediate segment 112 may have a different cross-sectional thickness at its ends than other intermediate segments 112. In certain embodiments, the segments 110 may be tapered such that in a formed position of the rod 105, the rod 105 tapers smoothly from base to tip. The thickest part of the thickest intermediate segment 112 may have a thickness of about 5 mm to 30 mm. The narrowest part of the narrowest intermediate segment 112 may have a thickness a about 2 mm to 20 mm.

In some embodiments, each of the intermediate segments 112 may have the same dimensions as each of the other intermediate segments 112.

Any suitable number of intermediate segments 112 may be used. In some embodiments, there may be no intermediate segments 112, with the collapsible rod 100 being comprised of only a base (proximal) segment 115 and a tip (distal) segment 125. In certain embodiments, the collapsible rod 100 may have multiple intermediate segments 112. For example, there may be between about one and ten intermediate segments 112. In some embodiments, there may be more than ten intermediate segments 112.

Each intermediate segment 112 may have any suitable length. All of the intermediate segments 112 may have the same lengths or they may have different lengths. The lengths may depend on the overall length of the collapsible rod 100 and the number of intermediate segments 112. In some embodiments, where collapsible rod 100 may be a fishing rod and may have a total of six segments 110, including a base segment 115, a tip segment 125 and four intermediate segments 112.

The base segment 115 may include a handle 120 of the fishing rod, as well as a reel seat 121. Any suitable handle and reel seat, as known in the art, may be used.

The tip segment 125 may, in some embodiments, may have a tip that is a free end that may not be directly coupled to any other segment other than the tip segment 125. The tip 126 may be open in some embodiments and in certain embodiments, the tip 126 may be closed.

Referring to FIG. 2, in embodiments where the collapsible rod 100 may be a fishing rod, the segments 110 may have guide rings 150 for guiding a fishing line coupled to them. Any suitable type of guide ring 150, as known in the art, may be used. The guide rings 150 may be coupled to the segments 110 using any suitable type of coupling. A guide ring 150 is also shown in FIG. 1a coupled to the tip segment 125.

The base segment 115 may also include a coupling portion for coupling with one of the plurality of segments 110. Any suitable coupler for coupling with a segment of the plurality of segments 110 may be used. For example, in some embodiments, the base segment 115 may include a base rod portion 123 for coupling with the intermediate segments 112 or the tip segment 125. When the collapsible rod 100 is in the formed rod position 105, the base rod portion 123 may couple with an intermediate segment 112 or a tip segment 125 using any suitable coupling. For example, in some embodiments, the facing ends of adjacent segments may be pushed together and held together using spring tension. In certain embodiments, an end of an intermediate segment 112 may be insertable into an end of the base rod portion 123. The ends together may form a pair of mateable mating ends 141, 142, with the more distal (relative to the base segment 115) end 142 being insertable into the other end 141 (male and female ends). In some embodiments, the male and female ends may be reversed.

The coupling used for coupling a segment 110 to the base rod portion 123 may be used for coupling adjacent intermediate segments 112 and the tip segment 125. In addition, the collapsible rod 100 may also include one or more positioning guides 140 for guiding adjacent segments 110 into the formed position 105 from a collapsed position. One of the one or more positioning guides 140 may be coupled to at least one mating end 141, 142 of each pair of mateable mating ends 141, 142 of the plurality of segments 110.

Any suitable type of positioning guide 140 may be used. For example, in some embodiments, the positioning guides 140 may be include a flared tube end coupled to a first mating end 141 of each pair of mateable mating ends 141, 142 for receiving a second mating end 142 of the respective pair of mateable mating ends 141, 142. The positioning guide 140 may be coupled to a mating end 141 using any suitable coupling. For example, in some embodiments, the positioning guide 140 may be threaded onto the mating end

141. In certain embodiments, a flared portion may be coupled by inserting one end of it into the mating end 141. In some embodiments, the positioning guide 140, which may include a flared end, may be integrally formed as part of the mating end 141.

In some embodiments, the positioning guide 140 may comprise a tapered end 145 coupled to the second mating end 142 of each pair of mateable mating ends 141, 142 for mating with the first mating end 141 of the respective pair of mateable mating ends 141, 142. As with a flared end, the tapered end 145 may be coupled to the second mating end 142 using any suitable coupling. For example, in some embodiments, the tapered end 145 may be inserted into the second mating end 142 and held in place using, for example and without limitation, a friction fit, adhesives or threads. In certain embodiments, the tapered end 145 may fit over the second mating end 142 and may be, for example and without limitation, attached to the second mating end 142 using threads, a friction fit, or adhesives. In some embodiments, the tapered end 145 may be integrally formed with the second mating end 142.

In certain embodiments, the tapered end 145 may have a hole passing through it along a longitudinal axis.

In some embodiments, the positioning guide 140 may include both a tapered end 145 at the second mating end 142 and a flared tube end at the first mating end 141. In certain embodiments, the tapered end 145 may be coupled to the first mating end 141 and the flared tube end may be coupled to the second mating end 142.

A tapered end 145 or a flared tube end may be advantageous as a positioning guide by providing passive guidance, allowing for relatively easy assembly of the collapsible rod 100 into the formed rod 105. The ends may move into alignment from positions of misalignment as the tapered end 145 slides into a fitted position in the first mating end 141.

In addition to acting as guides, the positioning guides 140 may provide rigidity to the collapsible rod 100 in the formed rod position 105. Having one mating end 142 insert into the second mating end 141 may provide resistance to bending of the collapsible rod. The insertable portion of the bending rod may be sufficiently long relative to its width to resist a bending force. For example, in some embodiments in a fishing rod application, insertable mating ends 141 may be about 3 mm to 30 mm long.

In some embodiments, the tapered end 145 and or the flared tube end of each pair of mateable mating ends 141, 142 may be shaped to create a bend in the collapsible rod 100 when the collapsible rod 100 is in the formed rod 105 position. For example, pairs of mating ends 141, 142 may be mutually shaped such that when mated, they create a bend in the formed rod 105. The mating ends 141, 142 may, for example, may have angled ends.

Referring again to FIG. 1a and FIG. 3, the collapsible rod 100 may also include a coupler 130 for coupling each segment 110 of the plurality of segments 110 to each immediately adjacent segment 110 of the plurality of segments 110. The coupler 130 may be biased to apply a force to hold the plurality of segments 110 in a formed rod position 105 and to urge the plurality of segments 110 into a formed rod position 105 from a collapsed position 160.

Any suitable type of coupler may be used as the coupler 130. For example, in some embodiments, flexible tabs may connect adjacent segments 110. The flexible tabs may have sufficient rigidity to hold the segments 110 in the formed rod position 105. Bending the tabs to disassemble the collapsible rod 100 into the collapsed position 160 may increase elastic tension in the tabs so that the tabs are biased to move the segments 110 back to the formed rod position 105. The tabs may be of sufficient stiffness to hold the segments 110 in position but may be sufficiently elastic to be bent by a user In certain embodiments, the tabs may be replaced by springs. Each end of the springs may be coupled to an external wall of adjacent segments 110, using any suitable coupling as is known by those skilled in the art.

In some embodiments, springs or cords may be attached to internal surfaces of the segments 110. For example, the springs or cords may be coupled to the internal side walls of tubular segments 110. In certain embodiments, the segments 110 may have internal anchor points at a central point of the cross-section for coupling the spring or cords. The anchor points may be solid portions inside the segments 110.

In some embodiments, the coupler 130 may include a plurality of couplers. For example, the coupler 130 may include a series of cords or springs. In certain embodiments, the coupler 130 may include elastic cords coupled to springs or to metallic wires or cables.

In some embodiments, the coupler 130 may be comprised of both cords and springs. A spring may be coupled to an interior portion of at least one segment of the plurality of segments 110. A cord portion of the coupler 130 may have a first end coupled to an end of the spring. The cord may pass from the interior of a tubular portion of the segment 110 to an interior of the tubular part of an adjacent segment of the plurality of segments 110. The second end of the cord may be coupled to the adjacent segment of the plurality of segments 110 such that the spring is under spring tension when the collapsing rod 100 is in the collapsed position 160 and biased to pull the collapsible rod 100 from the collapsed position 160 into alignment in the formed position 105. The second end of the cord may be coupled to an interior part of the adjacent segment, such as an interior wall or a solid central portion. In certain embodiments, the second end of the cord may be coupled to the adjacent segment 110 through a second spring and the second spring may be attached to the adjacent segment.

In some embodiments, the coupler 130 may comprise a cord 131 with a first end 132 coupled to an anchor in the base segment 115 and a second end coupled to the tip end 125. The cord may pass through the open mating ends 141, 142 of each segment 110. The coupler 130 may be under elastic tension when the collapsible rod 100 is in the formed position 105 and increased elastic tension when the collapsible rod 100 is in the collapsed position 160.

The cord 131 may be in a stretched state when the collapsible rod 100 is in the formed rod position 105. The elastic tension of the coupler 30 in the formed rod position 105 may be sufficient to hold the collapsible rod 100 in the formed rod position 105 and create resistance to the segments 110 being pulled apart. Together with the positioning guides 140, the elastic tension of the cord may be sufficient to hold the collapsible rod 100 in the formed rod position 105 during activities such as fishing in which the collapsible rod 100 be acted upon by a tensile force acting at an angle to the longitudinal axis of the collapsible rod 100. Having a mating end 142 that inserts into an adjacent end 141 may provide resistance to bending while the elastic tension of the coupler may provide resistance to the segments 110 being pulled apart. While having sufficient elastic tension to resist being pulled apart by force the collapsible rod 100 may face during use, the elastic tension in the cord 131 may still allow for a user to pull pairs of adjacent segments 110 apart enough such that the insertable part of a segment 110 has sufficient clearance to move laterally as the cord 131 is bent or folded.

Having a coupler 130 that passes through the length of the collapsible rod 100 in the formed rod position 105 may provide a uniform tension through the entire rod. In some embodiments, the tightness or elastic tension of the cord 131 may be variable, allowing a user to increase the rigidity of the collapsible rod 100. Any suitable tightening mechanism may be used. For example, in some embodiments, a gear or crank in the base segment 115 at an anchor point for the cord 131 may be used to pull the cord to tighten it. Turning the tightening mechanism, draws in cord slack to wind therearound and thus tighten the remaining cord within the rod. The cord 131 may also be loosened to allow the collapsible rod 100 to be disassembled into the collapsed position 160 with less force than if the cord 131 was not loosened. A removable anchor enables a broken cord to be repaired.

In certain embodiments, the cord 131 may be tightened by pulling it manually and locking it into place with a clasp or other suitable locking mechanism. In some embodiments, the coupler 30 may be comprised of a plurality of materials with a central portion of the coupler 30 being comprised of a material with a relatively larger elasticity than a material comprising an end portion of the coupler 130 coupled to the tip end 126. For example, the cord 131 may be made of an elastic material such as rubber and may be attached to a metallic wire or cable in the tip segment 125.

Figure 1B:
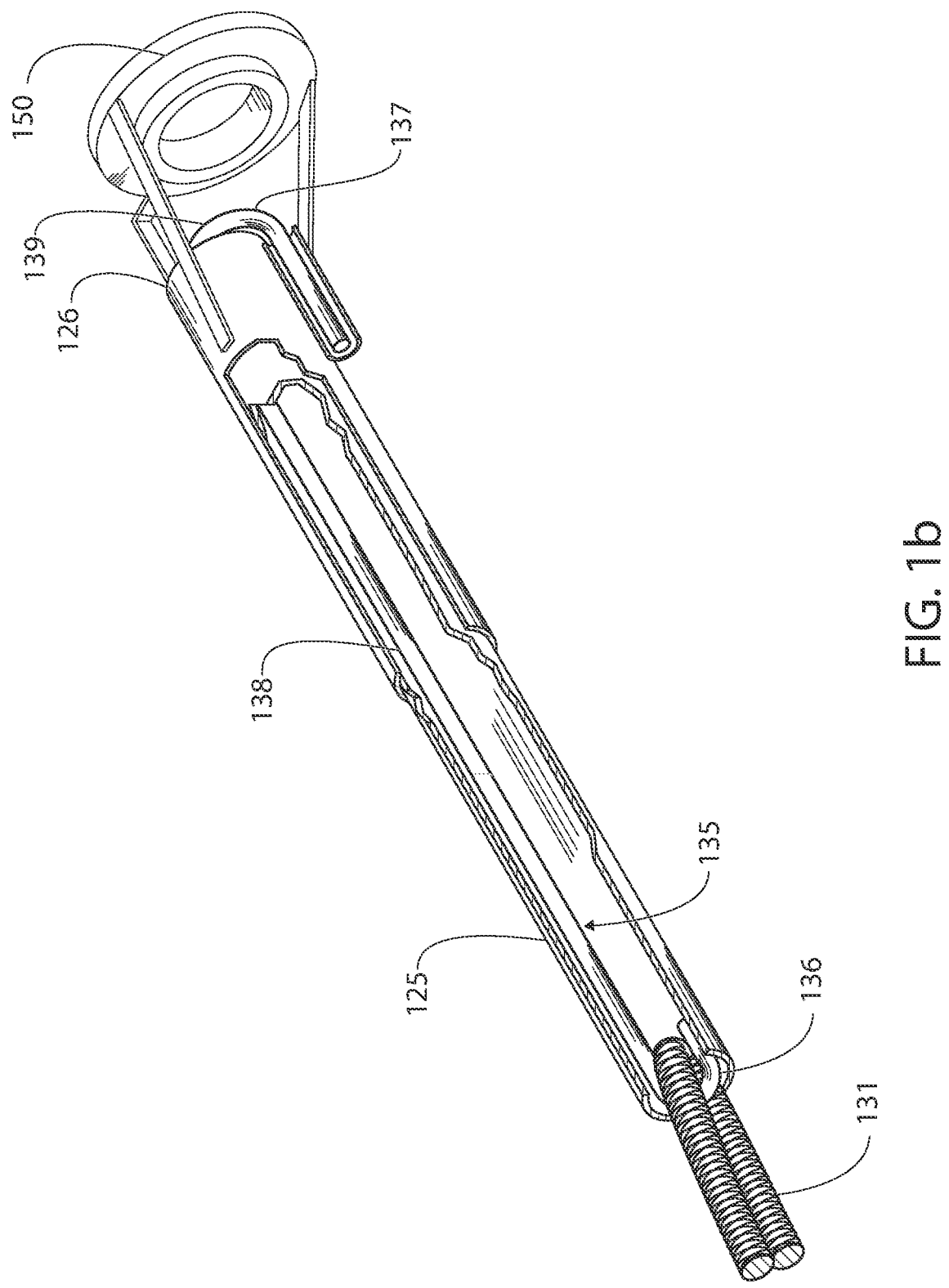

Referring to FIG. 1*b*, a double ended hook 135 is shown as a part of the coupler 130 in accordance with some embodiments. In these embodiments, an end portion of the coupler 130 may include a double ended hook 135 extending through the tip end 126. The double ended hook may have a first hooked end 136 for hooking a loop of the cord 131 and holding or anchoring the cord 131. A second hooked end 137 may have a shank 138 passing through a distal end of the tip end 126 with a throat 139 of the second hooked end 137 bending around an edge of a wall forming the tip end 126. The second hooked end 137 may hold the cord 131 in position by pulling against the tip end 126, with a hooked portion of the second hooked end 137 extending towards the base segment 115 along an external surface of the tip segment 125.

In some embodiments, the distal (tip) segment 125 may have a channel or an extension with a hole in it, as shown in FIG. 1*b*, for the hooked portion or hook arm of the second hooked end 137 to slide into. Having the hooked portion or hook arm covered may reduce the possibility of the second hooked end 137 getting caught on anything else, such as a fishing line.

Any suitable type of double ended hook 135 may be used. In some embodiments, metallic hooks may be used. The dimensions of the double ended hook 135 should be suitable for fitting inside the tip segment 125 and hooking to the cord 131. For example, in some embodiments, the double ended hook 135 may be formed of a stainless-steel line with a diameter of less than 1 mm.

The cord 131 may have a loop at end for attaching to the first hooked end 136 of the double ended hook 135. In certain embodiments, the cord 131 may be a continuous band with one part hooked or fixed to the base segment 115 and another part hooked by the first hooked end 136. In some embodiments, the cord 131 may have two ends, with both ends being coupled to the base segment 115 and a central part being looped around the first hooked end 136 of the double ended hook 135.

A hook inside the tip segment 125 may be advantageous in applications such as fishing rods due to the small size of the tip segment 125. A sufficiently strong cord may not fit inside the tip segment. Additionally, using a hook that passes through the distal (tip) end 126 to hook around the wall of the distal (tip) segment 125 may provide strength for anchoring the cord 131.

In some embodiments, not shown, the collapsible rod 100 may include one or more ringed inserts coupled to an interior of intermediate segments 112. The ringed inserts may be comprised of a low friction material and may have an aperture through them. The ringed inserts may be shaped and positioned to hold the cord 131 away from an interior wall of the intermediate segments 131. The ringed inserts may be coupled to the intermediate segments 131 using any suitable method as known by those skilled in the art.

The various parts of the collapsible rod 100 may be formed of any suitable materials. For example, in some embodiments, the cord 131 may be formed of rubber. The type of rubber may be selected by those skilled in the art based on the properties desired for a particular application. The handle 120 may be formed of, for example and without limitation, plastic, metal, composites such as carbon fiber or fibreglass, or cork. The segments 110 may be formed of, for example and without limitation, metals, plastics or composites such as a mixture of carbon fiber mixed with glass fiber. The segments 110 may be coated with a suitable coating, such as, for example, epoxy paint.

Figure 4:
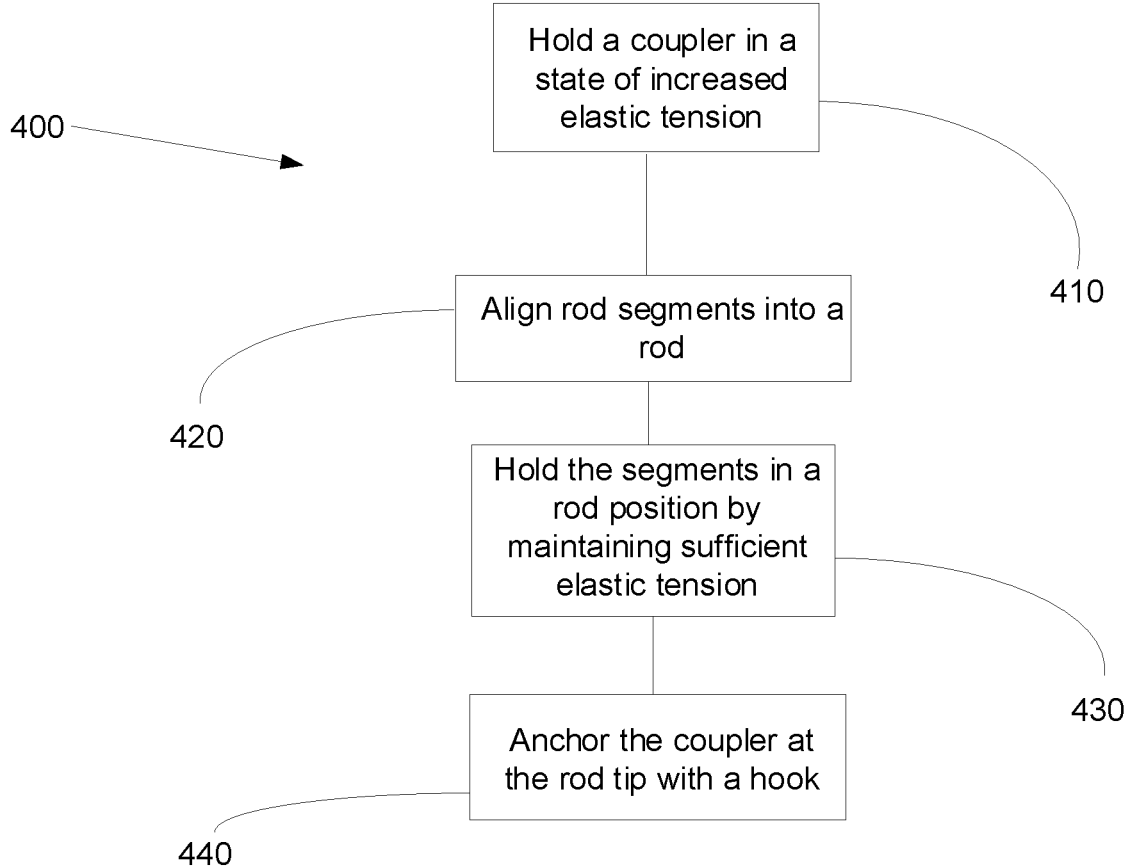
FIG. 4 shows a method for expanding a rod from a collapsed position to a formed position.

Referring to FIG. 4, a method for expanding a rod from a collapsed position to a formed position is shown at 400. At box 410, a coupler may be held in a state of increased elastic tension in the collapsed position of the rod. The coupler may pass through segments of the rod along a longitudinal axis of the segments of the rod, coupling the segments together. The segments of the rod may be folded against each other such that cylindrical walls of each of the segments are positioned adjacent to each other, thereby stretching the coupler relative to the length of coupler in the formed position of the rod. The segments may be held together in the collapsed position using any suitable tie or pouch.

At box 420, the segments of the rod may be aligned into the formed position of the rod by releasing a force used to hold the rod in the collapsed position, allowing the coupler to move to a state with a lower elastic tension by twisting and pulling adjacent segments into alignment. The force being released may be exerted by a tie or pouch, for example.

At box 430, the rod may be held in a formed position by maintaining sufficient elastic tension in the coupler to press mating ends of adjacent segments together, with the coupler stretching from a base segment of the rod to a tip of the rod.

At box 440, the coupler may be anchored to the tip with a hook passing through the tip and hooking to an external wall of the tip.

Aligning the segments of the rod into the formed position may also include pulling, by the coupler under elastic tension, a tapered end of a first segment into an adjacent opening of a second segment.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

Lure Case

The lure case shown in FIG. 5 stores plural lures, efficiently organized on visually distinctive inserts that enable a user to select one insert based on fishing conditions. The inserts may be distinguished from each other by colour, numbering, shading, or texture. The inserts are removable, so only the relevant lures thereon are handy for fishing and the others are safely stowed in the lure case.

After extensive research, optimal sets of lures have been identified and collected, each for a particular water condition and fish type. The concept is that a fisherman can ascertain the local water conditions and fish that are present then consult the instructions to select a single lure insert. Only that selected insert need be removed from the lure case and the remaining lures kept protected, clean and organized for other conditions. Each insert provides several lures suited to the conditions and fish type. There may be a removable container 23 or another insert holding spare lures.

Figure 6:
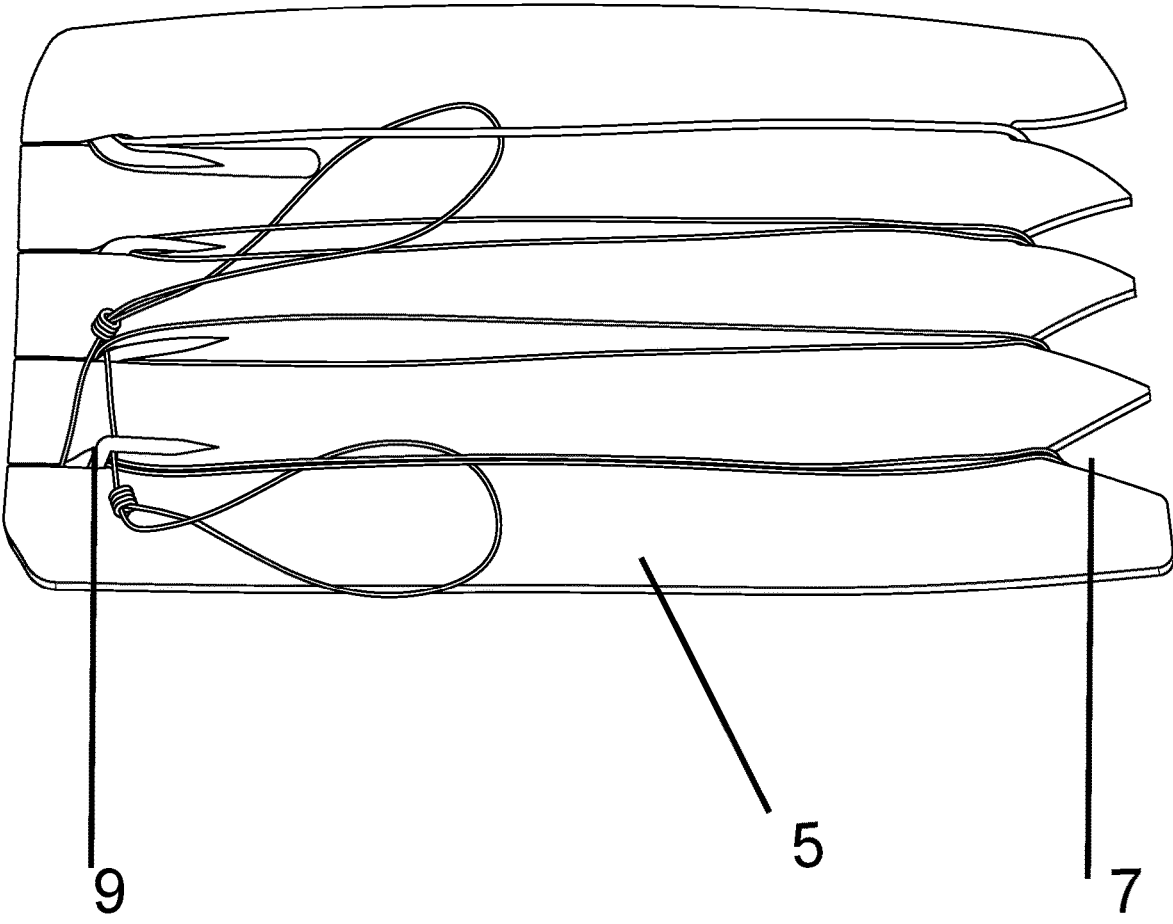
FIG. 6 is a cross-sectional view of a lure insert.

The lure case is closable using a zipper, snap, hook & loop fastener (e.g. Velcro™) or other closure member. The inserts may be a rigid or compliant material, such as plastic or foam. The inserts have features to separate lures with their leaders from each other and also to attach the lures to the insert. As shown in FIG. 6, insert 5 has ridges/grooves 7 to guide and separate the leaders of lures from each other. Foam inserts inherently allow the lure to attach simply by poking the hook into the material. Alternatively the insert may be holes to retain the hooks.

The retaining means 10 keep the inserts organized when opening the case or removing inserts. Each retainer holds plural inserts against the case. Retainers may be elasticated material to bias inserts against the case wall yet allow the inserts to be removed easily. Alternatively the retainer may be 'hook and loop' type material or snap-fit type connectors, either provided as a strap across the inserts or for connecting the back of each insert to the wall of the case.

The lure case is preferably coated in a rubberized coating to improve grip. The lure case may be provided as a kit of case, lures, inserts, and instructions. The instructions may be sized to fit within the lure case and laminated to protect them from water ingress.

Carrying Case

Figure 7:
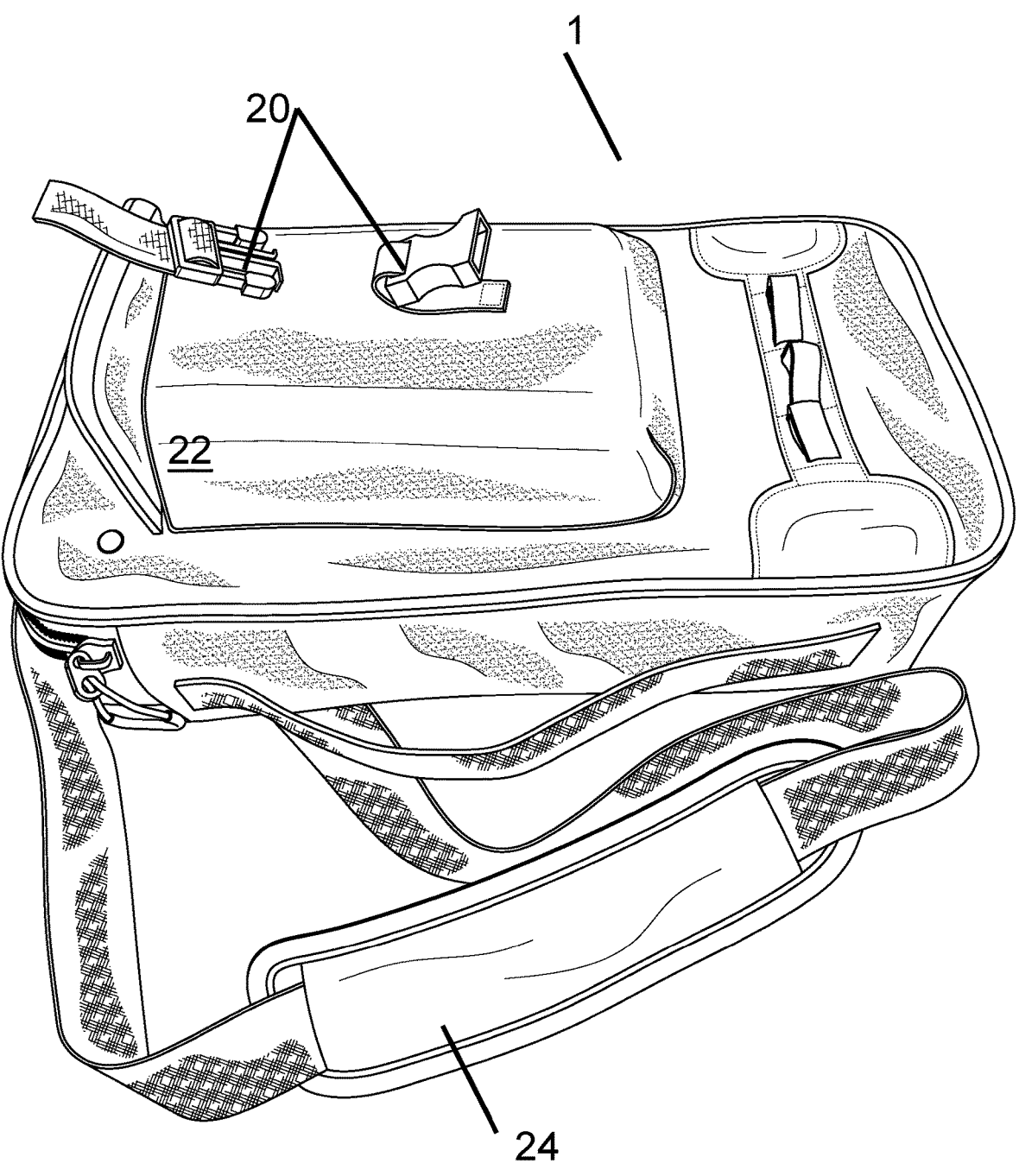
FIG. 7 is a perspective view of a fishing case.

A collapsible fishing rod should ideally be carried in a protective carrying case. As shown in FIG. 7, carrying case 1, comprises a (large) main enclosed compartment sized to accommodate a collapsed fishing rod, a (smaller) lure pouch 22 sized to snuggly fit the lure case 2, clasp 20, loops for accessories, and shoulder strap 24.

Figure 8:
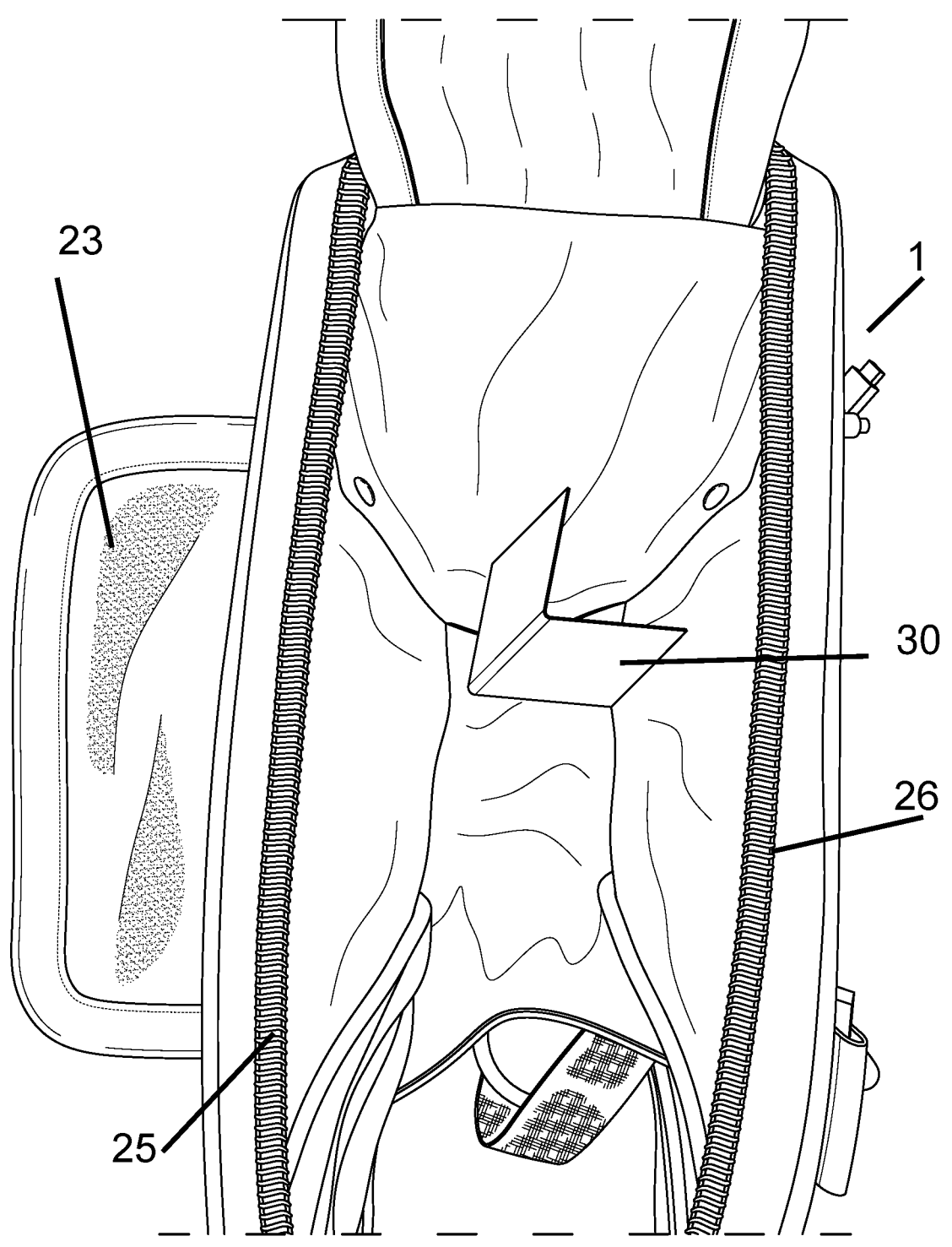
FIG. 8 is a top view of an opened fishing case with protective casing.

As shown in FIG. 8, the carrying case is openable and closable by a zipper, or preferably two zippers 25, 26 to access the fishing rod. The case is a soft, compliant material for carrying comfort. Woven nylon or polyester may be used. The outer surface may be a durable material to resist wear, while soft inner liner 29 may be made of material to resist dirt accumulation.

The carrying case is generally rectangular comprising: major surfaces (front and back panels) defined by Height H and Width W; sides defined by Height H and Depth D; and minor surfaces (top and bottom) defined by Depth D and Width W. In one example the Height is 30 to 60 cms, Width is 15 to 25 cms and Depth is 7 to 15 cms.

A rigid protective casing 30 with open top is fixed to the inside of the main compartment. The rigid liner may be made of hard plastic, such as ABS, polycarbonate, or High-density polyethylene (HDPE). The casing is sized to accommodate a fishing rod that has been collapsed into 4 to 6 pieces, opened at the top to remove the rod and open part way along a front wall to permit the attached reel to connect to the rod in transport. Alternatively the casing may have a structure extending from the front wall to house and protect the reel as well. The casing may be cylindrical or rectangular.

Figures 9A, 9B:
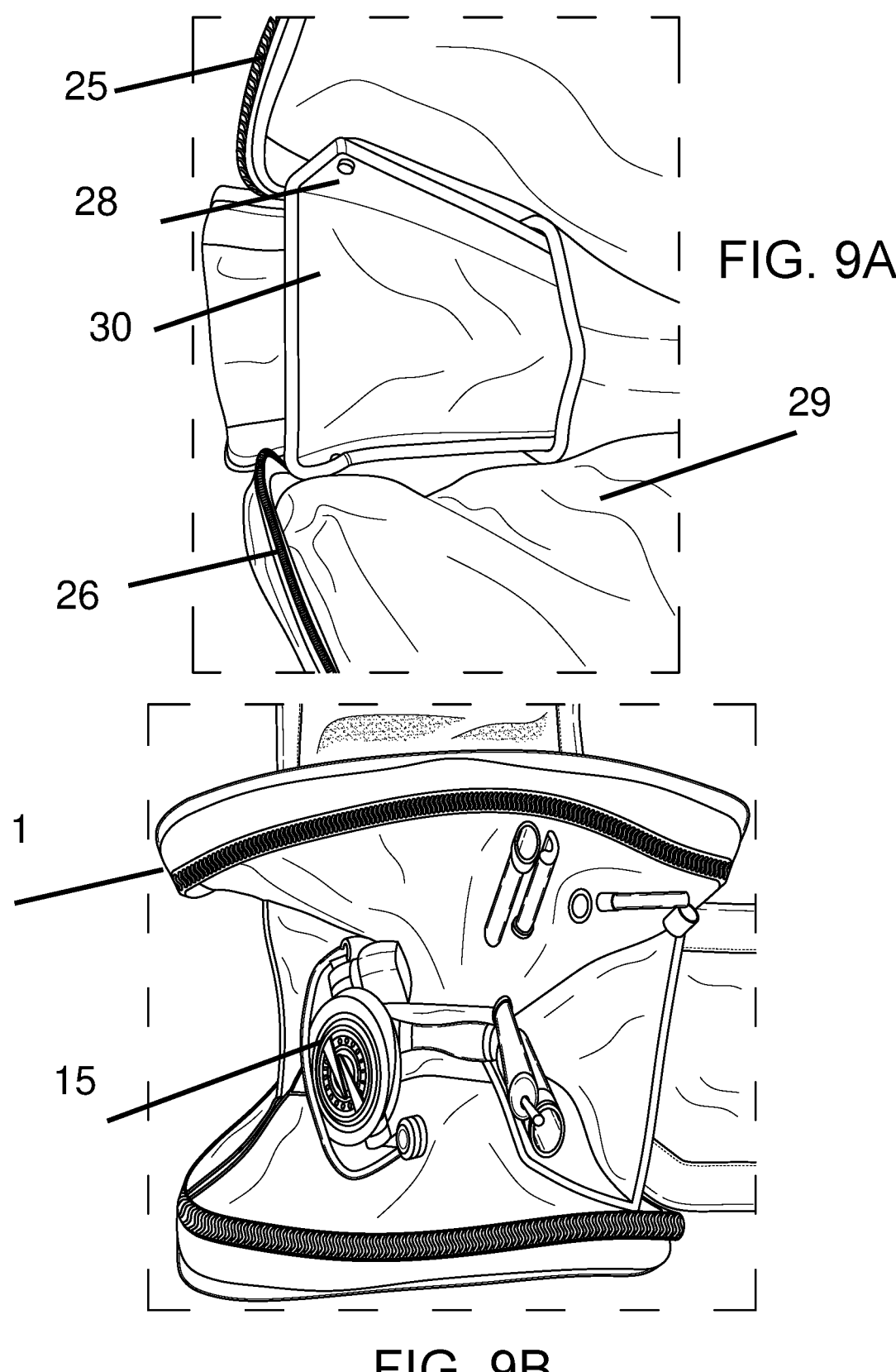
FIG. 9A is a close up view of a protective casing.
FIG. 9B is a top view of an opened fishing case with rod.

In the rectangular embodiment of FIGS. 8 and 9A, the casing has back wall, shorter front wall, and two sides. The protective casing extends substantially the height H and Depth D of the compartment, but only part of the width of the compartment. As shown in FIG. 9A the back wall extends substantially across one side of the carrying case. The front wall may be as wide as the back wall but only extends part way up from the bottom surface, to accommodate the butt of the rod up to the reel mounting bar. The casing may be fixed in place to the sides or major surfaces by adhesive, rivet, or similar hardware fixtures.

The two zippers are preferably spaced apart as wide as the rigid liner or as wide as the depth of the case 1 to facilitate removal of the rod and reel. The zipper(s) may extend along the length of the top panel and portion of the side panel.

Directional terms such as "top", "bottom", "upper", "lower", "left", "right", and "vertical" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", "coupling", and "couplable" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. The term "couplable", as used in the present disclosure, means that a first device is capable of being coupled to the second device. A first device that is communicatively couplable to a second device has the ability to communicatively couple with the second device but may not always be communicatively coupled.

The invention claimed is:

1. A collapsible fishing rod comprising:
   (a) a plurality of segments for forming the body of the collapsible rod, the plurality of segments including at least a base segment for forming a base portion of the collapsible rod and a tip segment for forming a tip section of the collapsible rod, with each segment of the plurality of segments coupled to each immediately adjacent segment of the plurality of segments;
   (b) a coupler for coupling each segment of the plurality of segments to each immediately adjacent segment of the plurality of segments, wherein the coupler is biased to apply a force to hold the plurality of segments in a formed position and to urge the plurality of segments into a formed position from a collapsed position;
   (c)) one or more positioning guides for guiding adjacent segments into the formed position from the collapsed position, one of the one or more positioning guides coupled to at least one mating end of each pair of mateable mating ends of the plurality of segments; and
   (d) a wire formed as a double ended hook having a distal hooked end that passes through a distal end of the tip segment hooking on an edge of a wall forming the tip section, with a portion of the distal hooked end extending towards the base segment along an external surface of the tip segment and said wire having a proximal hooked end hooking a loop of the coupler, wherein in the formed position, the plurality of segments are aligned end-to-end to form a rod.

2. A fishing case comprising an openable and closable compartment, carrying strap and protective casing fixed inside the compartment, wherein the protective casing comprises rigid sides and is open at a top, and a collapsible fishing rod comprising:

(a) a plurality of segments for forming the body of the collapsible rod, the plurality of segments including at least a base segment for forming a base portion of the collapsible rod and a tip segment for forming a tip section of the collapsible rod, with each segment of the plurality of segments coupled to each immediately adjacent segment of the plurality of segments;

(b) a coupler for coupling each segment of the plurality of segments to each immediately adjacent segment of the plurality of segments, wherein the coupler is biased to apply a force to hold the plurality of segments in a formed position and to urge the plurality of segments into a formed position from a collapsed position, (c) one or more positioning guides for guiding adjacent segments into the formed position from the collapsed position, one of the one or more positioning guides coupled to at least one mating end of each pair of mateable mating ends of the plurality of segments, and (d) a wire formed as a double ended hook having a distal hooked end that passes through a distal end of the tip segment hooking on an edge of a wall forming the tip section, with a portion of the distal hooked end extending towards the base segment along an external surface of the tip segment and said wire having a proximal hooked end hooking a loop of the coupler, wherein in the formed position, the plurality of segments are aligned end-to-end to form a rod.

3. The fishing case of claim 2, wherein the compartment is made of flexible fabric and comprises zippers for opening and closing.

4. The fishing case of claim 2, further comprising two parallel zippers on the compartment set apart as wide as the rigid casing.

5. The fishing case of claim 2, wherein one or more of the rigid sides of the protective casing extend substantially along a sidewall of the compartment.

6. The fishing case of claim 2, wherein the protective casing extends upto halfway across a width of the compartment.

7. The fishing case of claim 2, wherein the protective casing is partly open at a side that is not contacting the compartment.

8. The fishing case of claim 2, further comprising a front pouch integral with and mounted outside the compartment.

9. The fishing case of claim 2, wherein each segment of the plurality of segments is hollow with at least one of the mating ends being open.

10. The fishing case of claim 2 wherein the coupler comprises a cord with a first end coupled to the base segment and a second end coupled to the tip end and the cord passing through the at least one open mating end and being under elastic tension when the collapsible fishing rod is in the formed position and increased elastic tension when the collapsible rod is in the collapsed position.

11. The fishing case of claim 2 wherein the coupler is comprised of a plurality of materials with a central portion comprising a cord comprised of a material with a relatively larger elasticity than a material comprising an end portion of the coupler coupled to the tip end.

12. The fishing case of claim 2 further comprises a ringed insert coupled to an interior of an intermediate segment, the intermediate segment positioned between the base segment and tip segment in the formed position and the ringed insert comprising a low friction material and having an aperture through the low friction material, the ringed insert shaped and positioned to hold the cord away from an interior wall of the intermediate segment.

13. The fishing case of claim 2 further comprises a spring coupled to an interior portion of at least one segment of the plurality of segments and wherein the coupler comprises at least one cord, the cord having a first end coupled to an end of the spring and the cord passing from the interior portion of the at least one segment to an interior of an adjacent segment of the plurality of segments and having a second end coupled to a segment of the plurality of segments such that the spring is under spring tension when the collapsing rod is in the collapsed position and biased to pull the collapsed rod from the collapsed position into alignment in the formed position.

14. The fishing case of claim 2, wherein the coupler comprises a plurality of couplers.

* * * * *